United States Patent [19]

Jeong

[11] Patent Number: 5,220,413
[45] Date of Patent: Jun. 15, 1993

[54] DEVICE FOR A COMPATIBLE LUMINANCE/CHROMINANCE SEPARATION BETWEEN DIFFERENT STANDARD VIDEO SIGNALS

[75] Inventor: Tae-yun Jeong, Seoul, Rep. of Korea

[73] Assignee: Samsung Electronics Co. Ltd., Kyunggi, Rep. of Korea

[21] Appl. No.: 670,233

[22] Filed: Mar. 15, 1991

[30] Foreign Application Priority Data

Jun. 20, 1990 [KR] Rep. of Korea .............. 90-9099

[51] Int. Cl.⁵ ............................................. H04N 9/78
[52] U.S. Cl. ................................ 358/31; 358/153
[58] Field of Search ............ 358/17, 31, 158, 153; 331/25

[56] References Cited

U.S. PATENT DOCUMENTS

| | | | |
|---|---|---|---|
| 4,672,488 | 6/1987 | Gioiosa | 358/158 |
| 4,791,488 | 12/1988 | Fukazawa et al. | 358/158 |
| 4,860,090 | 8/1989 | Murata et al. | 358/13 C |
| 4,916,526 | 4/1990 | Faroudja et al. | 358/31 |
| 4,985,757 | 1/1991 | Yasuki et al. | 358/31 |
| 5,012,329 | 4/1991 | Lang et al. | 358/31 |
| 5,021,754 | 6/1991 | Shepherd et al. | 331/25 |
| 5,028,887 | 7/1991 | Gilmore | 331/25 |

Primary Examiner—James J. Groody
Assistant Examiner—Jeffrey S. Murrell
Attorney, Agent, or Firm—Morgan & Finnegan

[57] ABSTRACT

A preprocessing device of a system that can record and reproduce the luminance and chrominance signal separated from a composite digital VTR signal is disclosed.

The luminance/chrominance signal preprocessing device includes an analog/digital converter which samples a NTSC signal inputted as a composite video signal at a certain frequency, and converts the signal sample to a digital signal, a horizontal synchronizing separator that separates the horizontal synchronizing signal from the above NTSC signal, a PLL division that sends a clock signal fixed to the horizontal synchronizing signal outputted from the above horizontal synchronizing separator to the above analog/digital converter, and a luminance and chrominance signal outgoing from the above analog/digital converter is then separated into a luminance signal and a chrominance signal.

As a result, because the present invention is able to convert a NTSC/PAL signal to one suitable for television, the present invention may be utilized for preprocessing digital video signals where comparatibly high resolution is required.

1 Claim, 10 Drawing Sheets (A)

(c)

(A)

(D)

DEVICE FOR A COMPATIBLE LUMINANCE/CHROMINANCE SEPARATION BETWEEN DIFFERENT STANDARD VIDEO SIGNALS

BACKGROUND OF THE INVENTION

1. Field of the Invention

The present invention relates to a NTSC/PAL compatible luminance/chrominance signal preprocessing device, and more particularly to a preprocessing device of a system that can record and reproduce the luminance and chrominance signal separated from the composite signal of a digital video tape recorder (VTR).

2. Description of the Prior Art

Generally, there are composite broadcast systems and component broadcast systems employed to transmit television signals. At present, television broadcasting utilizes a composite system which uses band compression technology. However, it is very hard to completely separate the chrominance signals from the luminance signal, and thus picture quality deteriorates due to mutual interference. In the component system, however, the luminance signal and chrominance signals are transmitted through separate lines, so that it is possible to prevent picture quality deterioration. In addition the bandwidth of the signal is wider.

Table 1 below shows sampling frequency (B) and recording method (C) according to the input signal (A) in a digital VTR.

TABLE 1

| Standard | Input Signal(A) | Sampling Frequency(B) | Recording Method(C) |
|---|---|---|---|
| 1 | composite | 14.3 MHz(4 fsc) | composite |
| 2 | composite | 10.7 MHz(3 fsc) | |
| 3 | component | luminance: 13.5 MHz | 4:2:2 |
|  | component | (R-Y): 6.75 MHz | component |
|  |  | (B-Y): 6.75 MHz | |

Present digital VTRs generally follow the number 3 standard, which facilitates mutual communication between the NTSC and PAL signals. However, since the input signal of the number 3 standard system is a component system, a problem arises in that users cannot use television sets or monitors that utilize the composite system employed by present television broadcasting.

OBJECTS OF THE INVENTION

It is therefore an object of the present invention to provide a NTSC/PAL compatible luminance/chrominance signal processing device that enables recording and reproducing of the video signal in the compatible NTSC and PAL signal standard while using existing television sets and monitors.

SUMMARY OF THE INVENTION

According to preferred embodiments of the present invention, there is provided a luminance/chrominance signal preprocessing device which includes an analog/digital converter for converting the NTSC signal of a composite video signal into a digital signal after sampling at a predetermined frequency; a horizontal synchronizing separator for separating a horizontal synchronizing signal from the NTSC signal; a phase-locked loop (PLL) device for transmitting clock signals which are locked to the horizontal synchronizing signal outputted from the horizontal synchronizing separator to the analog/digital converter; and a luminance/chrominance signal separator for separating the digital signal transmitted from the analog/digital converter into a luminance signal and chrominance signal.

BRIEF DESCRIPTION OF THE DRAWINGS

The invention will be described in greater detail below by way of reference to the following drawings, in which.

DETAILED DESCRIPTION OF THE INVENTION

Figure 1:
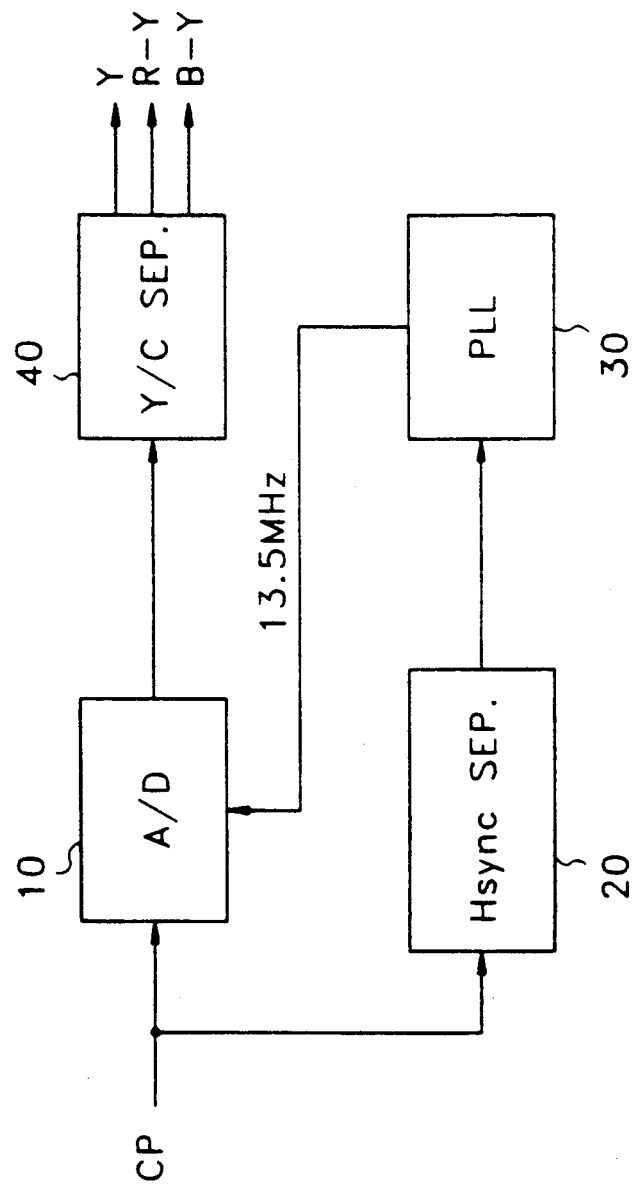
FIG. 1 is a block diagram of the luminance/chrominance signal preprocessing device of the present invention.

FIG. 1 is a block diagram of a luminance/chrominance signal preprocessing device according to the present invention.

Figure 3:
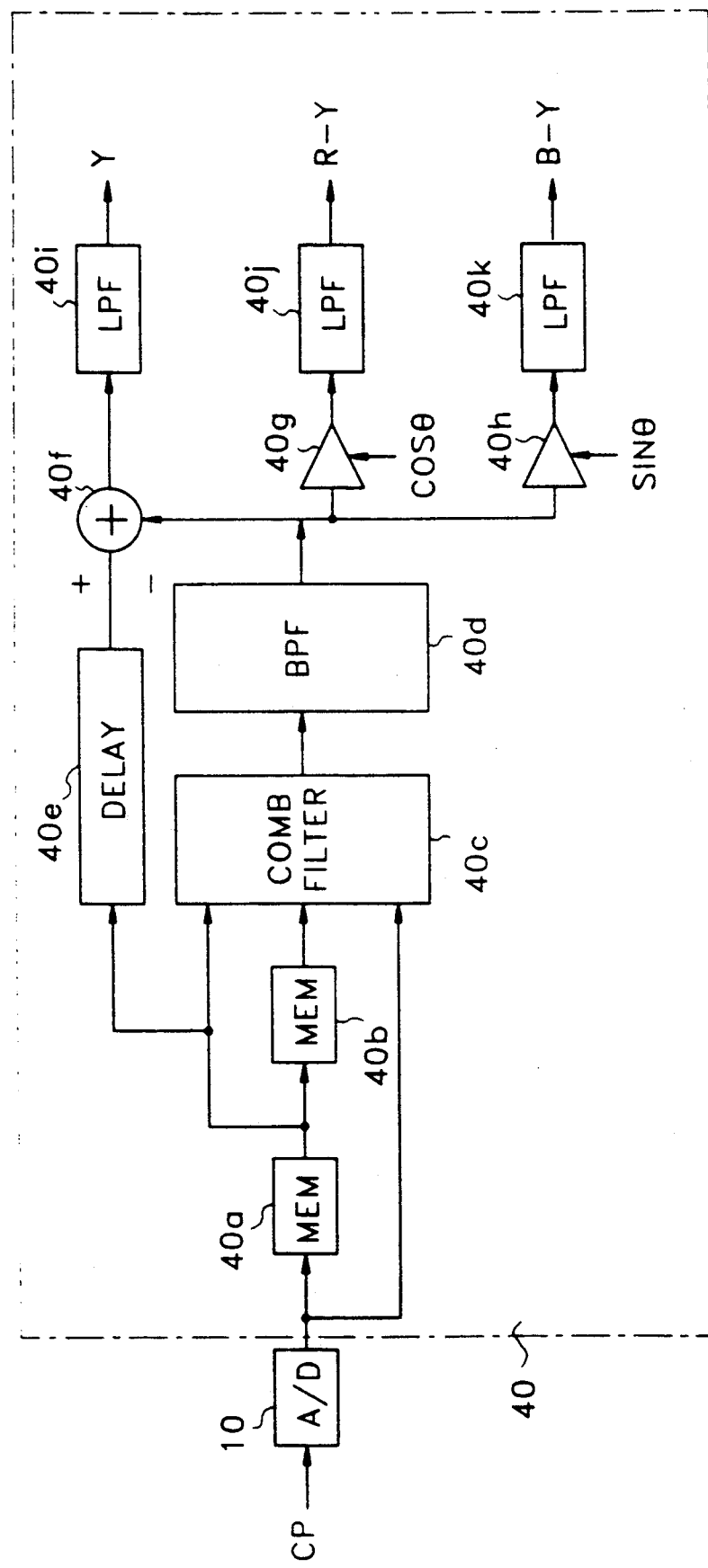
FIG. 3 is a schematic diagram of the luminance and chrominance signal separator employed in the preprocessing device according to the present invention.

In FIG. 1, analog/digital converter 10 converts the inputted composite video signal CP to a digital signal using a 13.5 MHZ (858 fh) signal locked to the horizontal synchronizing signal as the sampling frequency. Luminance and chrominance signal separator 40 separates and processes the digital signal converted in the above analog/digital converter to produce the luminance Y and chrominance R-Y, B-Y signals. Band pass filter 40$d$ and low pass filters 40$i$, 40$j$, and 40$k$, constituting part of the luminance and chrominance signal separator 40, are shown in FIG. 3. These filters are constructed as follows to both reduce the amount of hardware needed and increase the computing speed.

Figure 4:
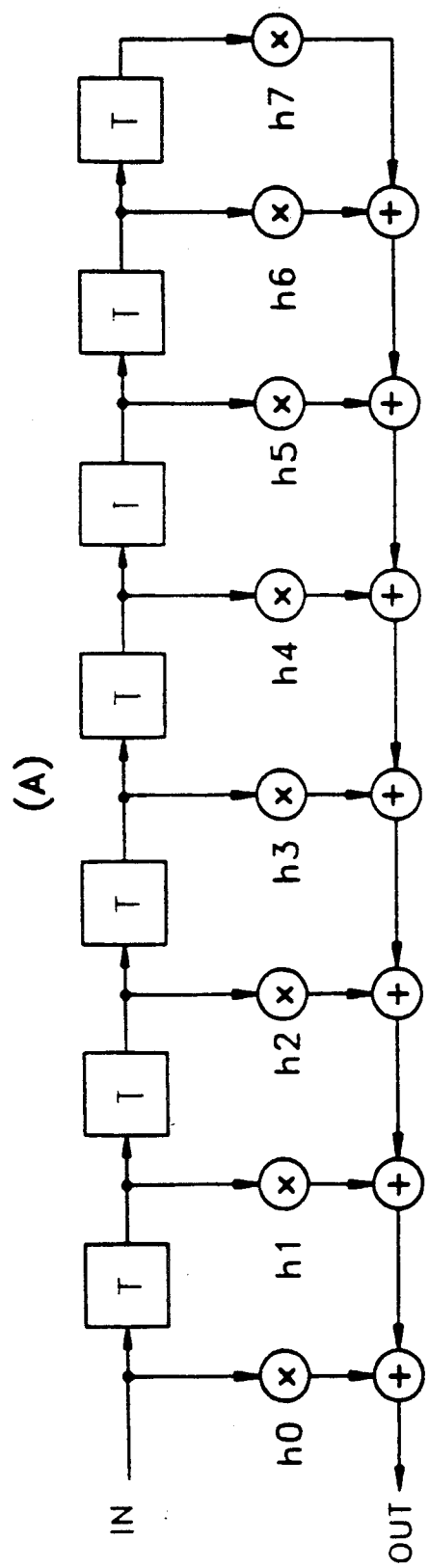
FIGS. 4A to 4C are equivalent circuit diagrams of the Finite Impulse Response (FIR) filters proposed for the band pass filter employed in the luminance/chrominance signal preprocessing device according to the present invention.
Figure 4:
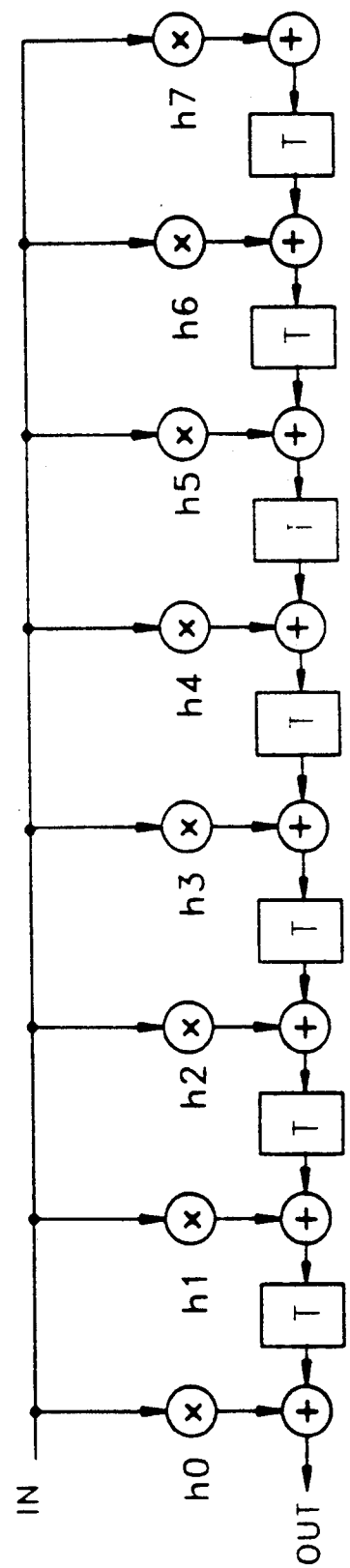
Figure 4:
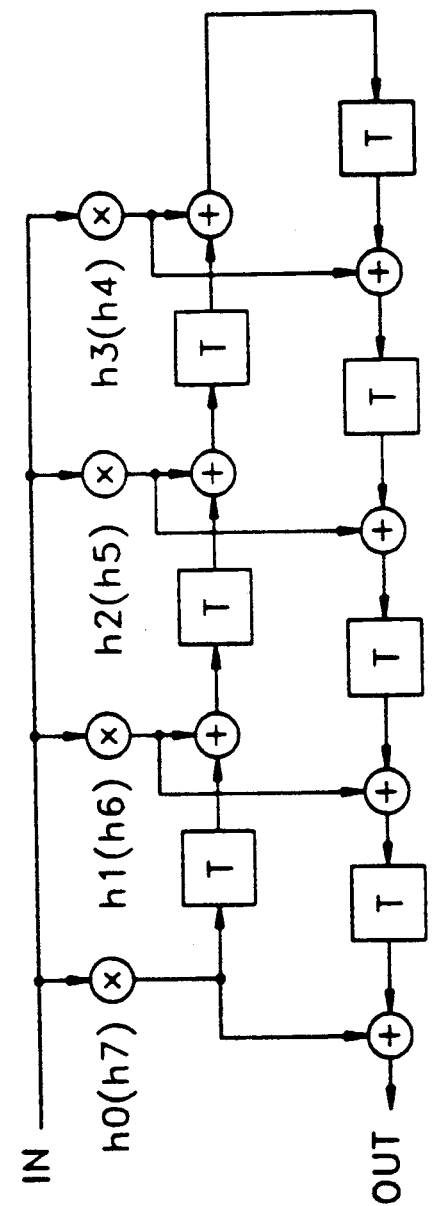

FIG. 4C illustrates an equivalent circuit diagram of a Finite Impulse Response (FIR) filter proposed for the above band pass filter 40$d$, which is constructed from an FIR filter having 4 multipliers instead of the conventional 8 multipliers with 8 taps. This reduction of hardware is accomplished by utilizing a symmetrical property of the band pass filter coefficient.

FIG. 4A is a general block diagram of the above FIR filter, FIG. 4B is the equivalent circuit diagram of the FIR filter shown in FIG. 4A, and both show the conventional use of 8 multipliers with 8 taps. FIG. 4C according to the present invention is equivalent to the circuit diagram shown in FIG. 4B, but employing only 4 multipliers. In FIG. 4C, the tap coefficients are $h_0 = h_7$, $h_1 = h_6$, $h_2 = h_5$ and $h_3 = h_4$.

The output of band pass filter 40$d$ is inputted to a first and a second signal multipliers 40$g$ and 40$h$, respectively, and then mixed with the signal components of $\cos\Theta$ and $\sin\Theta$.

The output signal sent from the first signal multiplier 40$g$ is then filtered by a second low pass filter 40$j$, thereby producing the chrominance signal R-Y. Similarly, the output signal from the second multiplier 40h is then filtered by a third low pass filter 40k, thereby producing the chrominance signal B-Y.

Figure 5:
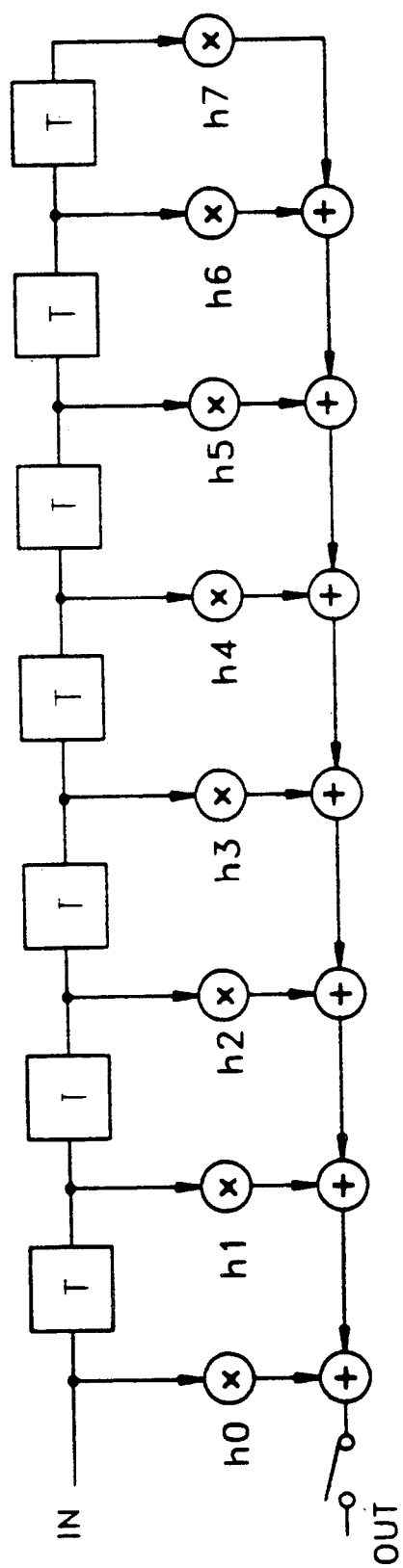
FIGS. 5A thru 5D are equivalent circuit diagrams of FIR filters proposed for a low pass filter employed in the luminance/chrominance signal preprocessing device according to the present invention.
Figure 5:
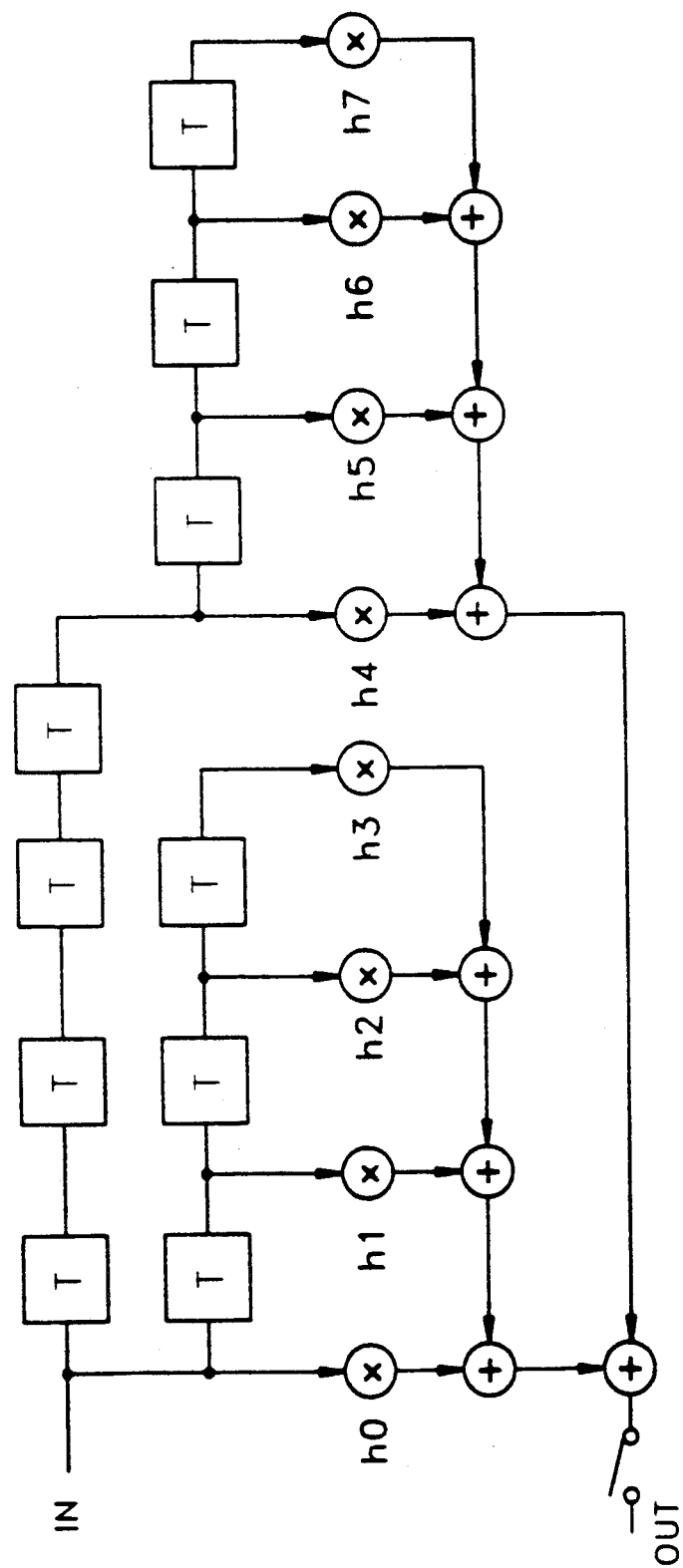
Figure 5:
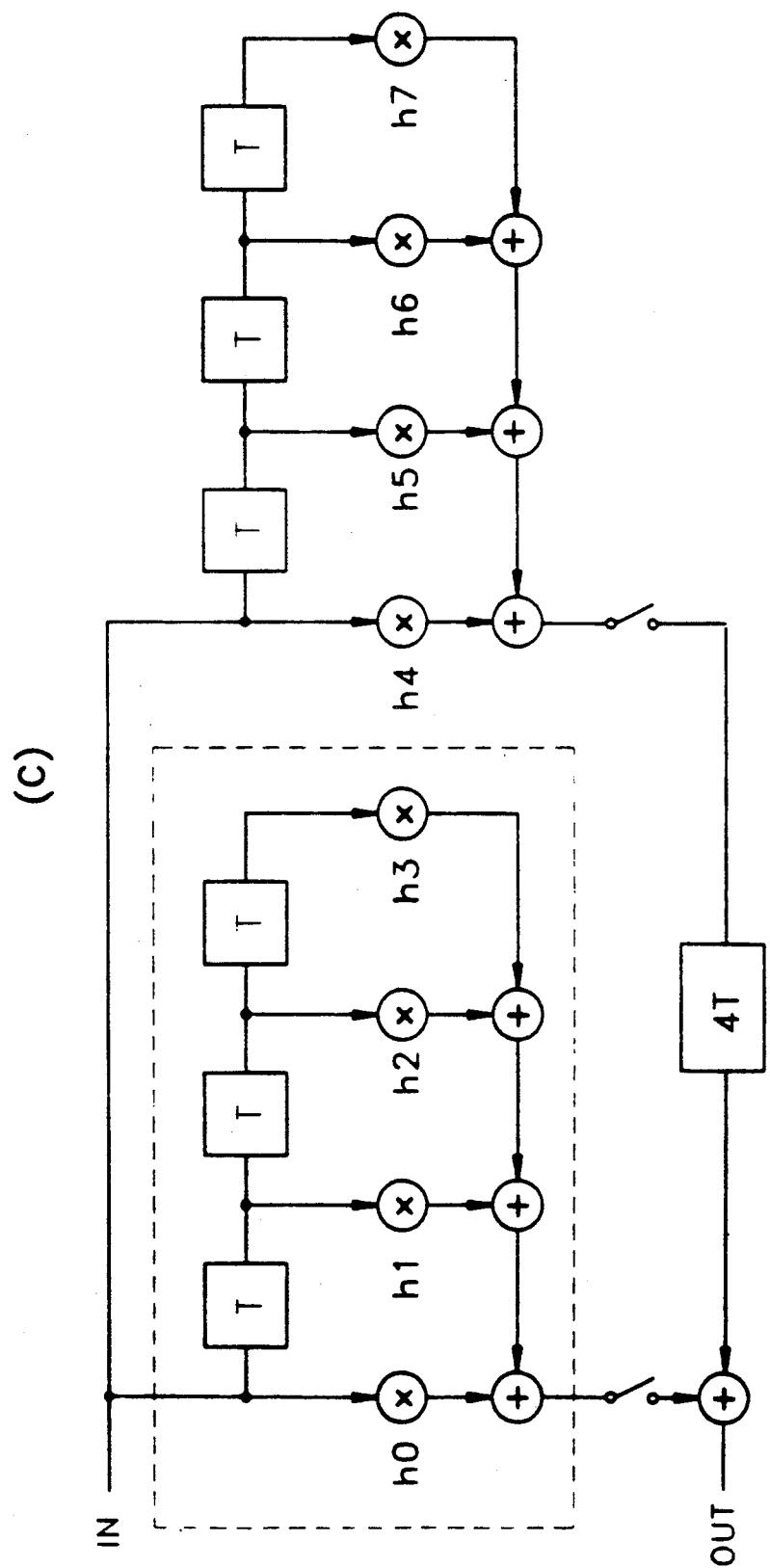
Figure 5:
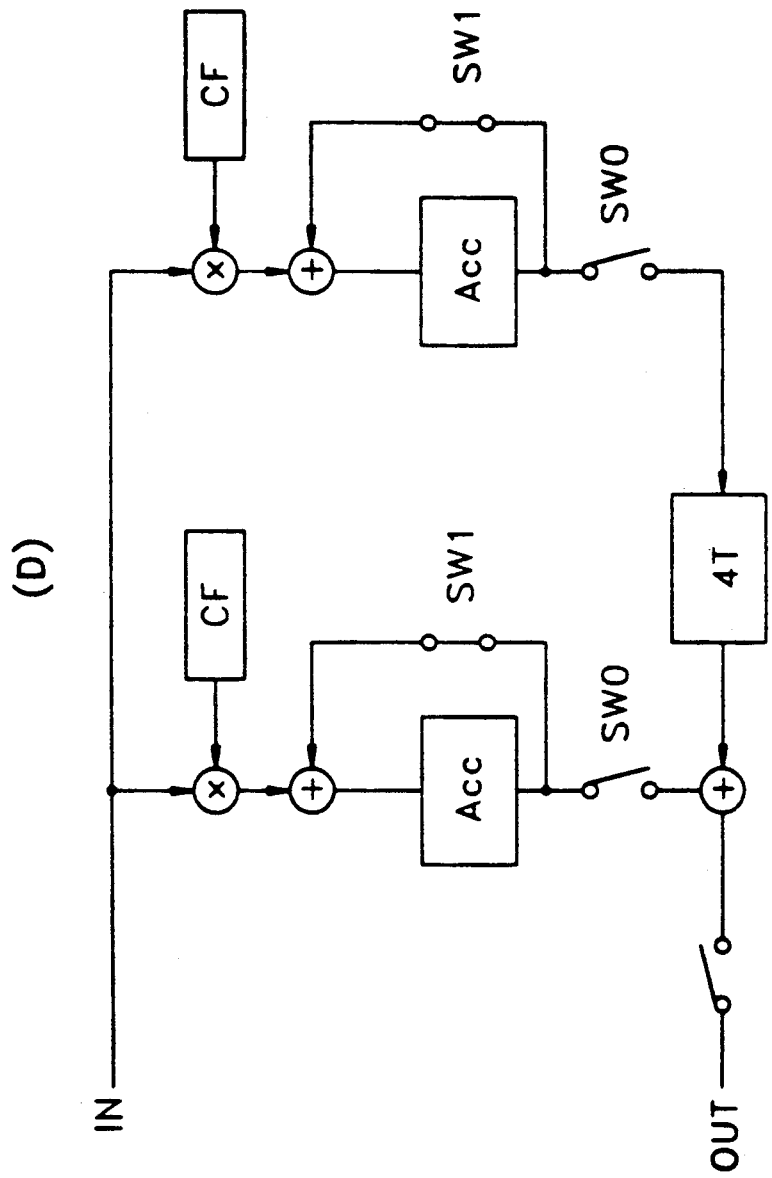

FIG. 5A shows a general block diagram of a FIR filter proposed for the above low pass filters 40i, 40j and 40k, and FIG. 5B shows the equivalent circuit diagram of the circuit shown in FIG. 5A.

In more detail, FIG. 5B is an equivalent circuit diagram made by adding 4 delay elements to the circuit shown in FIG. 5A, and FIG. 5C is an equivalent circuit diagram made by moving delay element 4T from input side IN of FIG. 5B to the output side OUT.

FIG. 5D is an equivalent circuit diagram of the dotted line section shown in FIG. 5C through the continuance operation of the down sampling switches SW0 and SW1.

The relationship between the down sampling switches SW0 and SW1 is shown in Table 2 below.

TABLE 2

|     | 0T  | 1T  | 2T  | 3T  | 4T  | 5T  |
|-----|-----|-----|-----|-----|-----|-----|
| CF  | h3  | h2  | h1  | h0  | h3  | h2  |
| SW0 | on  | off | off | off | on  | off |
| SW1 | off | on  | on  | on  | off | on  |

In the above Table 2, CF represents a predetermined coefficient. As shown in FIG. 3, delay portion 40e delays digital data outgoing from a first line memory 40a for a predetermined period of time, and then sends the data to an adding portion 40f, which subtracts the chrominance signal component from the digital data NTSC signal delayed by the delay portion 40e, and inputs the result to a first low pass filter 40i. Low Pass filter 40i filters the signal fed from the adding portion 40f and then outputs the luminance signal Y. First and second line memories, 40a and 40b respectively, store the digital signal of the analog/digital converter synchronized to a clock signal generated from the phase-locked loop portion 30. Comb-shaped filter 40c receives the digital data from the first 40a and second 40b line memories and separates the luminance and chrominance signals to a comb-shaped filter signal sent to band pass filter BPF 40d, as shown in FIG. 3.

Figure 2:
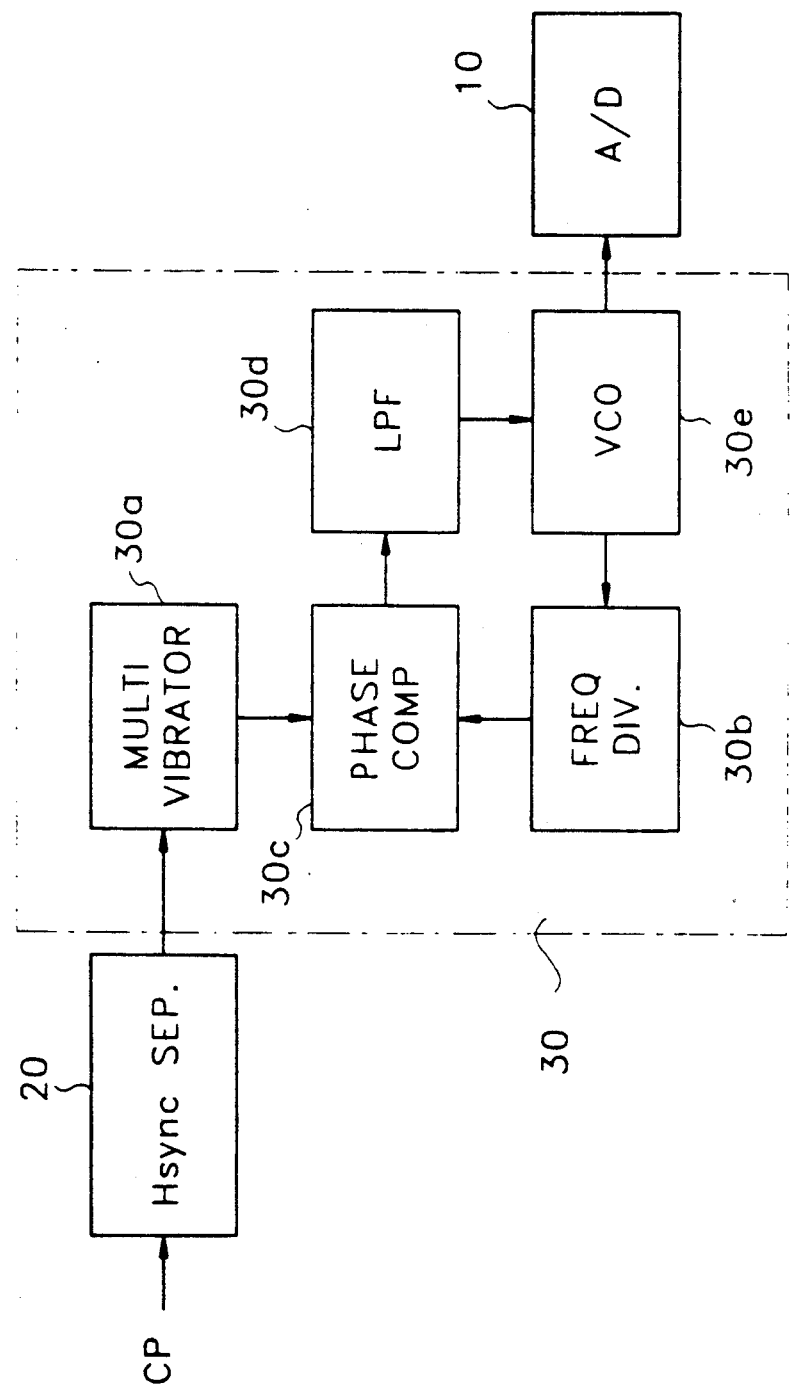
FIG. 2 is a circuit diagram of the PLL portion employed in the preprocessing device of the present invention.

As shown in detail in FIG. 2, phase-locked loop portion 30 transfers to an analog/digital converter 10 a clock signal which is fixed to a horizontal synchronizing signal. Multivibrator 30a converts the horizontal synchronizing signal outputted from a horizontal synchronizing separator into a first frequency of 15.734 KHz. Frequency divider 30b outputs the above first frequency by frequency-dividing an oscillating frequency of a second frequency of 13.5 MHz oscillated from a voltage controlled oscillator VCO 30e. A phase comparator 30c compares the phase of the signals output from multivibrator 30a and the frequency divider 30b, and outputs the compared signal to low pass filter LPF 30d. VCO 30e transfers the oscillating frequency of the above second frequency of 13.5 MHz and also synchronizes the filtered signal from LPF 30d. VCO 30e also provides a stable 13.5 MHz clock signal, fixed to the above horizontal synchronizing signal, to the analog/digital converter 10, as shown in FIG. 1.

As described above, the present invention samples a NTSC composite video signal at 13.5 MHz, which is the compatible standard of a NTSC/PAL signal, and processes the resultant signal, thereby reducing the amount of hardware needed and increasing the computing speed. This results in several advantages: production cost reductions and effective signal processing, as well as the ability to utilize digital video signal processing at a preprocessing stage where comparatibly high resolution is required. The present invention can thereby convert a NTSC/PAL signal to one compatible with existing television sets and monitors.

We claim:
1. A device for a compatible luminance/chrominance separation between different standard video signals comprising:
   (a) an analog/digital converter for sampling a composite video signal by a predetermined frequency and for converting to a digital signal;
   (b) a horizontal synchronizing separator for separating the horizontal synchronizing signal from said composite video signal;
   (c) a phase-locked loop portion for transferring to said analog/digital converter a clock signal fixed to the horizontal synchronizing signal output from said horizontal synchronizing separator, said phase-locked loop comprising:
      a multivibrator for converting the separated horizontal synchronizing signal to a first frequency of a predetermined duty;
      a frequency divider for outputting said first frequency by frequency-dividing an oscillating frequency having a second frequency;
      a phase comparator for comparing a phase of signals output from said multivibrator and said frequency divider and for outputting the compared value;
      a low pass filter for filtering the output from said phase comparator; and
      a voltage controlled oscillator for transferring the oscillating frequency of said second frequency to said frequency divider, for synchronizing the filtered signal from the low-pass filter, and for outputting said second frequency as a clock signal; and
   (d) a luminance/chrominance signal separator for separating the digital signal fed from the above analog/digital converter into a luminance signal and a chrominance signal, said luminance and chrominance signal separator comprising:
      first and second line memories for storing the digital signal of said analog/digital converter synchronized to the second frequency clock signal generated from said phase-locked loop portion;
      a comb-shaped filter for separating the luminance and the chrominance signal to a comb-shaped filter signal in response to the respective digital data from the output stage of the first and second line memories and said analog/digital converter;
      a bandpass filter for passing a particular frequency range of said comb-shaped filter signal;
      a delay means for delaying the output signal from said first line memory for a predetermined period of time;
      an adding portion for adding the signals output from said bandpass filter and delay means;
      first and second multipliers for outputting mixed signals after mixing angular phase signal components with a chrominance signal passed through said bandpass filter; and
      first, second, and third low pass filters for outputting a luminance signal and two chrominance signals after filtering signals of said adding portion and said first and second multipliers.

* * * * *